United States Patent
Meyer et al.

(10) Patent No.: US 11,667,167 B2
(45) Date of Patent: Jun. 6, 2023

(54) SUPPORT LINK ARM

(71) Applicant: BENTELER AUTOMOBILTECHNIK GMBH, Paderborn (DE)

(72) Inventors: Stephan Meyer, Bielefeld (DE); Juergen Hummelt, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 17/399,214

(22) Filed: Aug. 11, 2021

(65) Prior Publication Data

US 2022/0048348 A1 Feb. 17, 2022

(30) Foreign Application Priority Data

Aug. 12, 2020 (DE) ..................... 10 2020 121 231.3

(51) Int. Cl.
*B60G 7/00* (2006.01)

(52) U.S. Cl.
CPC .......... *B60G 7/001* (2013.01); *B60G 2206/10* (2013.01); *B60G 2206/7102* (2013.01); *B60G 2206/72* (2013.01); *B60G 2206/8101* (2013.01); *B60G 2206/81022* (2013.01); *B60G 2206/8201* (2013.01)

(58) Field of Classification Search
CPC .... B60G 7/001; B60G 7/005; B60G 2206/10; B60G 2206/11; B60G 2206/7102; B60G 2206/72; B60G 2206/722; B60G 2206/8101; B60G 2206/81022; B60G 2206/8103; B60G 2206/8201; B60G 2204/416
See application file for complete search history.

(56) References Cited

U.S. PATENT DOCUMENTS

| | | | |
|---|---|---|---|
| 3,690,176 A | 9/1972 | Connolly et al. | |
| 6,019,383 A | 2/2000 | Kociba et al. | |

(Continued)

FOREIGN PATENT DOCUMENTS

| | | |
|---|---|---|
| DE | 102004042964 A1 | 3/2006 |
| DE | 102008015393 A1 | 9/2009 |

(Continued)

OTHER PUBLICATIONS

'Schindler S, Machine Translation of EP 2711214 A1 Obtained Jul. 29, 2022', Mar. 26, 2014, Entire Document. (Year: 2014).*

(Continued)

*Primary Examiner* — Karen Beck
*Assistant Examiner* — Scott F. Underwood
(74) *Attorney, Agent, or Firm* — Hauptman Ham, LLP

(57) ABSTRACT

The disclosure relates to an elongate link arm member of a support link arm. A ball joint socket is disposed on a first longitudinal and of the link arm member. The link arm member in a sheet-metal shell construction mode is formed from sheet metal and has a cavity portion. The ball joint socket is a forging or casting from metal and possesses a fastening appendage which is configured in a materially integral manner so as to be in one piece with said ball joint socket. The ball joint socket by way of the fastening appendage engages in the cavity portion of the link arm member and is joined to the link arm member.

19 Claims, 8 Drawing Sheets

(56) References Cited

U.S. PATENT DOCUMENTS

| | | |
|---|---|---|
| 2011/0210528 A1 | 9/2011 | Haas et al. |
| 2012/0021241 A1 | 1/2012 | Perry et al. |
| 2012/0104713 A1 | 5/2012 | Frens |
| 2013/0328283 A1* | 12/2013 | Korte ............... F16C 7/08 |
| | | 280/124.134 |
| 2014/0339785 A1* | 11/2014 | Meyer ............ F16C 11/069 |
| | | 403/135 |
| 2016/0167471 A1 | 6/2016 | Hudler et al. |
| 2017/0305224 A1 | 10/2017 | Galazin |
| 2018/0154721 A1* | 6/2018 | Meyer ................ B60G 7/001 |
| 2018/0326803 A1* | 11/2018 | Meyer ................ B60G 7/001 |
| 2020/0025275 A1 | 1/2020 | Schroeder et al. |
| 2020/0148020 A1* | 5/2020 | Meyer ................ B60G 3/225 |
| 2021/0053408 A1* | 2/2021 | Meyer ................ B60G 7/001 |
| 2021/0213795 A1 | 7/2021 | Hoschouer et al. |

FOREIGN PATENT DOCUMENTS

| | | | | |
|---|---|---|---|---|
| DE | 102010018903 A1 * | 12/2010 | ............ | B60G 7/001 |
| DE | 102009049400 A1 | 4/2011 | | |
| DE | 102010010665 A1 | 9/2011 | | |
| DE | 102011007621 A1 * | 10/2012 | ............ | B60G 7/001 |
| DE | 112010001366 T5 | 10/2012 | | |
| DE | 102012018553 A1 | 3/2014 | | |
| DE | 202014103182 U1 | 7/2014 | | |
| DE | 102014117207 A1 | 5/2016 | | |
| DE | 102014226536 A1 | 6/2016 | | |
| DE | 102019125771 A * | 3/2021 | | |
| EP | 0836019 A1 | 4/1998 | | |
| EP | 2711214 A1 * | 3/2014 | ............ | B60G 7/001 |
| JP | H0725215 A * | 1/1995 | | |
| KR | 20010065889 A * | 7/2001 | | |
| KR | 20120045104 A * | 5/2012 | | |
| WO | 2015003769 A1 | 1/2015 | | |
| WO | 2020010199 A1 | 1/2020 | | |

OTHER PUBLICATIONS

Office Action for German Application No. 10 2020 121 231.3 dated Apr. 24, 2021; 7pp.

European Search Report for European Application No. 21187787.3 dated Dec. 14, 2021; 22 pp.

Office Action for European Application No. 21187787.3 dated Feb. 7, 2023; 8pp.

* cited by examiner

SUPPORT LINK ARM

RELATED APPLICATIONS

The present application claims priority of German Application Number 10 2020 121 231.3 filed Aug. 12, 2020, the disclosure of which is hereby incorporated by reference herein in its entirety.

FIELD

The present disclosure relates to a support link arm.

BACKGROUND

Chassis link arms are associated with the wheel suspension system of a motor vehicle and absorb dynamic forces when driving. The absorbed forces are damped and the driving comfort is enhanced by the mounting. The chassis link arms handle wheel-guiding tasks as well as the transmission of spring forces, damping forces and stabilizing forces.

Depending on their tasks, a difference is made between guide link arms, support link arms and auxiliary link arms. Guide link arms handle the guiding of the wheel, without supporting the weight of the vehicle. Predominantly axial forces are introduced at the joints of the guide link arms. Support link arms absorb radial forces such as braking forces and driving forces. Said support link arms, conjointly with other chassis components, additionally support the weight of the vehicle. Support link arms have additional force-introduction points for spring forces and damper forces. Auxiliary link arms have the task of connecting the guide link arms and support link arms to one another, or in the case of special axial constructions, of also connecting said guide link arms and support link arms with the wheel bearing.

Chassis link arms are also differentiated according to the number of the attachment points thereof. The simplest embodiment is the two-point link arm. Such a chassis link arm has in each case one ball joint and one rubber mount, or two rubber mounts or hydro-mounts. Chassis link arms having ball joints are always used for connecting the wheel bearing to the body at the front axle. Said chassis link arms having ball joints enable the required freedom of movement for steering the wheel.

A chassis link arm which has an elongate link arm member which is made from sheet metal is described in DE 10 2010 010 665 B4. The link arm member on both the longitudinal ends thereof has in each case one bearing receptacle.

DE 10 2008 015 393 C5 describes a chassis link arm, or a method for producing the latter, respectively. The chassis link arm is formed by a one-piece sheet-metal shell and has a U-shaped cross section, wherein the sheet-metal shell is formed as a molding of two sub-shells and a spine which connects the sub-shells.

WO 2015/003769 A1 also describes a chassis link arm having an elongate link arm member from a one-piece metal sheet, said link arm member being formed by bending and possessing two mutually spaced apart, opposite lateral walls. The lateral walls at the free longitudinal sides thereof are connected to one another at least in portions. The link arm member on the axial ends thereof possesses in each case one bearing receptacle.

Described as part of the content of DE 10 2012 018 553 A1 is a chassis link arm having a wheel-proximal joint and a superstructure-proximal or body-proximal, respectively, joint, and a link arm member which extends between the joints. The link arm member is formed from a fiber-composite plastics material.

A guide link arm having a link arm member in a shell construction mode is described in WO 2020/010199 A1.

A wheel suspension arm, or a wheel suspension strut, respectively, for a motor vehicle is described in DE 11 2010 001 366 T5.

A link arm for a wheel suspension system of a motor vehicle is furthermore derived from DE 10 2014 226 536 A1.

DE 10 2014 117 207 A1 explains an axle link arm for establishing on an axle tube of a commercial vehicle.

SUMMARY

The present disclosure relates to a support link arm. As already discussed, support link arms have the function of supporting torques, the latter being created when braking or accelerating, and of absorbing the forces acting from a spring/damper element. Therefore, very high requirements are set for the stiffness of a support link arm, in the vehicle height direction of the latter. Therefore, support link arms are usually made from steel or aluminum by a forging or casting method. The wheel-proximal joint by way of a ball joint establishes the connection between the chassis link arm and the wheel bearing. The ball joint is fastened to a wheel bearing. The opposite bearing, usually a rubber mount or a sleeve bearing, is fastened to an axle support. An additional attachment point in the central region of the link arm member serves for receiving a spring or damper element. The high production costs associated with the method, and also the weight, are disadvantageous.

The disclosure is based on the object of achieving a support link arm which is improved in terms of the component weight and in terms of production technology, and which reliably meets the requirements in terms of load-bearing capability, such as the high requirements in terms of stiffness.

The achievement of this object lies in a support link arm.

Various design embodiments and refinements of the inventive support link arm.

The support link arm has an elongate link arm member. A ball joint socket is disposed on a link arm end of the link arm member. According to the disclosure, the link arm member is formed from sheet metal and has a cavity portion. The ball joint socket is a forging or casting from metal, such as from steel or aluminum. The ball joint socket has a fastening appendage. The fastening appendage is configured in a materially integral manner on the ball joint socket so as to be in one piece with the latter. The ball joint socket by way of the fastening appendage engages in the cavity portion of the link arm member and is joined to the link arm member.

One aspect which is relevant to the disclosure is that the ball joint socket is produced from metal by forging or casting, having a fastening appendage which is molded or shaped, respectively, in a materially integral manner so as to be in one piece with said ball joint socket. The connection to the link arm member takes place by way of the fastening appendage. The link arm member in a sheet-metal construction mode is produced from sheet-metal blanks, such as shell segments or sheet-metal shells, respectively. Steel types which are able to be welded are used here. Shell segments as sub-parts form the link arm member. Shell segments are to be understood to be sheet-metal shells. The latter are produced by tensile-compressive forming of a sheet-metal blank. The link arm member is assembled from two sheet-metal shells. The latter, along the contact faces thereof, are at least in portions joined to one another in a materially integral manner, welded. The link arm member is able to be formed from a sheet-metal blank by forming or folding, respectively. In this case, the link arm member in the cross section is configured so as to be rectangular, and has two lateral walls which, at a spacing from one another, extend in a mutually parallel manner and are connected to one another by way of a web. The side opposite the web is able to be closed by a flanged portion which is likewise produced in one piece by folding. The side opposite the web is able to be connected by tabs.

The link arm member is composed of a steel material and has the following mechanical properties:

Yield point $R_p 0.2$: 480-880 MPa
Tensile strength $R_m$: 580-1050 MPa
Min. elongation at break A80 mm: >8%

The ball joint socket is composed of a steel material and is embodied as a forging or casting and has the following mechanical properties:

Yield point $R_p 0.2$: 400-600 MPa
Tensile strength $R_m$: 600-820 MPa
Min. elongation at break A5: >14%

Tensile tests for metallic materials for determining the mechanical properties are standardized in ISO 6892.

The sheet-metal blank or blanks forming the link arm member are cut and optionally pre-formed so as to be adapted to the final contour of the link arm member, and provided with embossings, modifications, bearing openings or beads and/or ribs.

The shell segments, or the sheet-metal shells, respectively, have a wall thickness between 2.0 mm and 4.5 mm. The fastening appendage possesses a width which is sized between 20 mm and 40 mm. The ball joint socket has a largest external diameter between 35 mm and 60 mm.

The link arm member in the vertical cross section has a height and a width, wherein the height is sized so as to be larger than the width. The height is double the size of the width, or larger. The ratio of height to width is more than 2:1 and is in the range between 3:1 to 5:1.

The link arm member is formed by shell segments, or from two sheet-metal shells, respectively, having the front cavity portion directed toward the ball joint socket. The link arm member is able to have further cavity portions in the longitudinal direction. The link arm member in the vertical cross section is configured so as to be rectangular, having a longer side of the rectangle which is disposed in the vehicle height direction in terms of the installed position of the chassis link arm. The high requirements set for stiffness in the vehicle height direction are taken into account in this way.

The cross-sectional geometry of the link arm member is able to adjusted so as to correspond to the requirements in terms of stiffness. There is the possibility of locally varying the stiffness, by varying the cross-sectional geometry.

The lateral walls of the cavity portion and lateral portions of the fastening appendage contact one another. The fastening appendage is able to be configured such that said fastening appendage locally supports the lateral walls of the cavity portion, or the shell segments, respectively. To this end, support flanks which are in contact with support portions provided on the link arm member is able to be configured on the fastening appendage.

The link arm member in portions is configured so as to be rectangular in the vertical cross section. A rectangular cross-sectional configuration is provided in the cavity portion.

Furthermore, the link arm member in portions are able to be configured so as to be H-shaped in the vertical cross section. Such an H-shaped configuration is able to be configured in the central longitudinal portion of the link arm member. Adjacent longitudinal walls of the shell segments that form the link arm member contact one another here and form a vertical web. Cavity portions run in the longitudinal direction above and below the vertical web.

The support link arm on the first longitudinal end thereof has the ball joint socket. A bearing receptacle is provided on the second longitudinal end of said support link arm that lies opposite the first longitudinal end. Said bearing receptacle is formed by bearing openings which are provided in mutually parallel-running lateral wall portions in the region of the second bearing end.

The ball joint socket on the first longitudinal end forms a first attachment point. The bearing receptacle on the second longitudinal end is a second attachment point. The support link arm is able to have a further attachment point for a spring/damper element. This third attachment point is an additional force-introduction point for spring and damper forces which act perpendicularly and are greater than the horizontal forces. The joint integrated there is therefore also referred to as a support joint. The third attachment point for the spring/damper element is able to be configured in the link arm member. The bearing receptacle of the third attachment point is in turn configured by bearing openings in the lateral walls of the link arm member, or by the sheet-metal shells forming the link arm member, respectively. Each bearing opening has an encircling collar which is directed into the interior of the link arm member. The collars of the two bearing openings contact one another and form a bearing ring.

One embodiment of the support link arm according to the disclosure provides that the attachment point for the spring/damper element is configured in the cavity portion and in the fastening appendage. The cavity portion has two mutually spaced apart, opposite lateral walls, wherein one bearing opening is provided in each lateral wall. The fastening appendage likewise has a bearing opening. The bearing openings in the lateral walls and the bearing opening in the fastening appendage are disposed so as to be mutually coaxial, thus having a common axis.

A bearing receptacle for a support joint is able to be configured in the fastening appendage. To this end, the fastening appendage expediently has a support joint portion which toward the free end is adjoined by an end portion. The support joint receptacle is established by a bearing opening which transversely penetrates the support joint portion of the fastening appendage. The fastening appendage by way of the end portion protrudes into the cavity portion of the link arm member. The link arm member, by way of the end-side-proximal free end of the cavity portion, impacts contact faces of the support joint portion and is joined to the fastening appendage.

The link arm member is able to have at least one bead which is oriented in the longitudinal direction of said link arm member. One bead is in each case configured in each shell segment so as to be approximately above the central longitudinal portion. Accordingly, the link arm member along the longitudinal sides thereof has in each case one bead. The behavior in terms of stiffness, and the force-absorption capability of the chassis link arm, is able to be influenced by the shape, the disposal and the design embodiment of the bead, or of the plurality of beads, respectively.

The link arm member is able to have at least one predetermined kinking point. The predetermined kinking point is provided close to the attachment that is proximal to the axial support, thus in the region in front of the second longitudinal end.

One design embodiment of a predetermined kinking point is able to be embodied by a bead which runs in the z-direction (height direction) and extends across the entire height of the link arm member. The predetermined kinking point is provided so that the chassis link arm, or the link arm member thereof, respectively, kinks in a targeted manner when a predetermined force level acting on the wheel in the vehicle transverse direction is exceeded. The support link arm is also intended to collapse in a targeted manner in a so-called small overlap crash, with a force acting on the wheel in the vehicle longitudinal direction.

In the case of a bead which runs in the z-direction and extends across the entire height of the link arm member, the link arm member in this region has a curved contour profile. A predetermined kinking point is able to alternatively and/or additionally also be embodied by a local constriction of the link arm member or by clearances in the link arm member, and likewise by a reduction in the wall thickness of the link arm member in regions. A reduction in the wall thickness is able to be configured, for example by decreasing the sheet-metal thickness in at least one shell segment.

The ball joint socket having the materially integral one-piece fastening appendage and the link arm member are joined to one another. This is able to take place in a materially integral manner by welding. Alternatively and/or additionally, the ball joint socket and the link arm member is able to be joined to one another in a form-fitting manner. A form-fitting join is embodied by a rivet connection, thus by riveting.

According to the disclosure, this is a support link arm. The latter, proximal to the wheel, has a ball joint socket. The support link arm, proximal to the body, on the second longitudinal end opposite the first longitudinal end has a bearing receptacle for a rubber mount. The support link arm furthermore has an additional force-introduction point for spring and damper forces. This third attachment point for a spring/damper element is integrated in the support link arm. The support link arm transmits spring forces, damping forces and stabilizing forces according to load, and meets highest requirements in terms of strength and stiffness. Synergistic effects are achieved as a result of the combination of the ball joint socket in the embodiment as a forging or casting from metal, and the link arm member embodied in a sheet-metal construction mode. A significant saving in terms of weight is able to be achieved as a result of the link arm member being from sheet metal, such as in a shell construction mode from shell segments. The production of the support link arm is efficient.

BRIEF DESCRIPTION OF THE DRAWINGS

The disclosure is described in more detail hereunder by means of exemplary embodiments which are illustrated in the drawings, in which.

DETAILED DISCLOSURE

In the figures, the same reference signs are used for similar or identical components although a repeated description is omitted for reasons of simplification.

Figure 1:
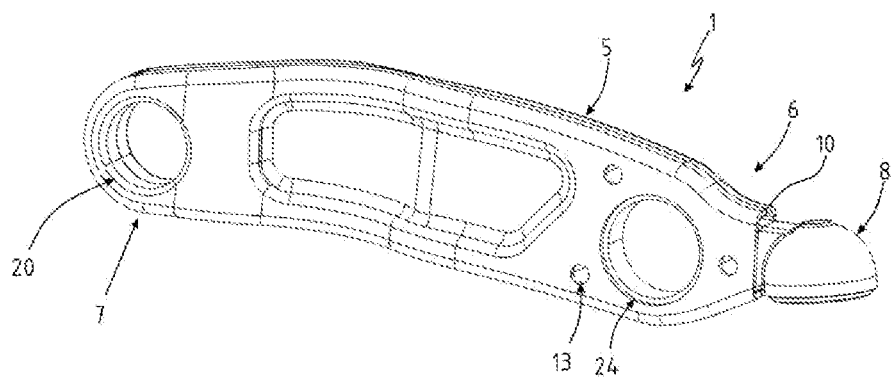
FIG. 1 shows a first embodiment of a support link arm according to the disclosure in a perspective illustration.
Figure 2:
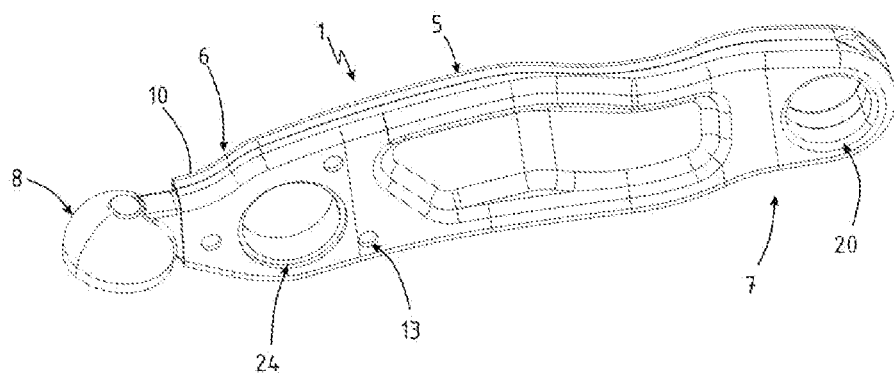
FIG. 2 shows the support link arm in another perspective according to the disclosure.
Figure 3:
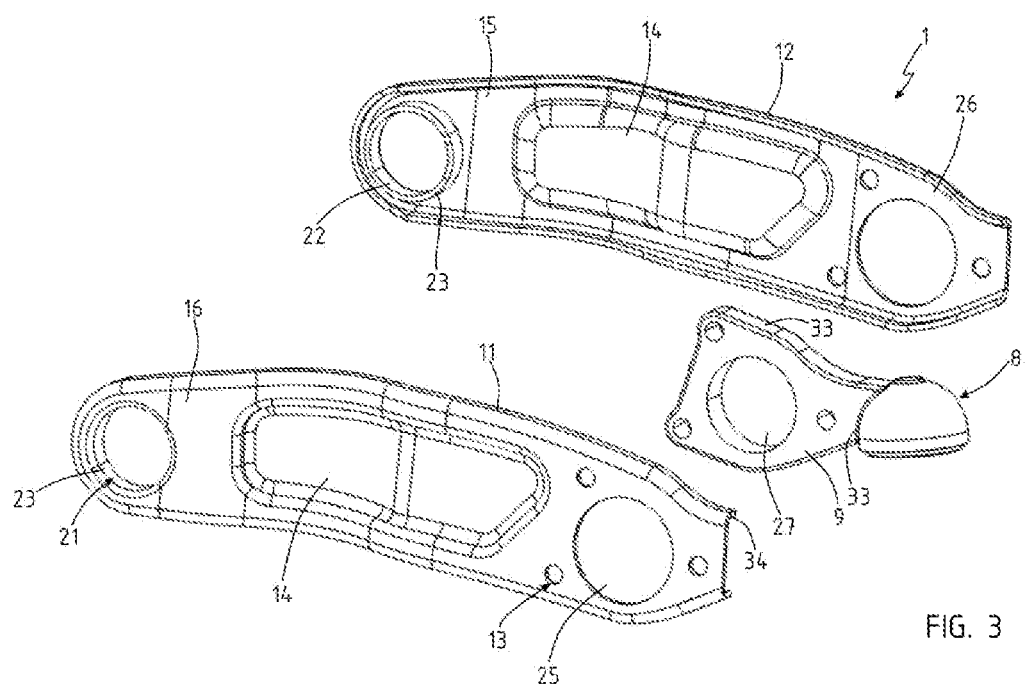
FIG. 3 shows the components of the support link arm in an exploded illustration according to the disclosure.
Figure 4:
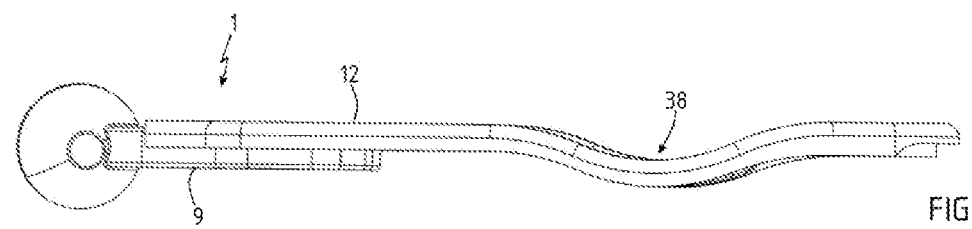
FIG. 4 shows the support link arm in a plan view and without the rear shell segment in terms of the installed position in a vehicle according to the disclosure.
Figure 5:
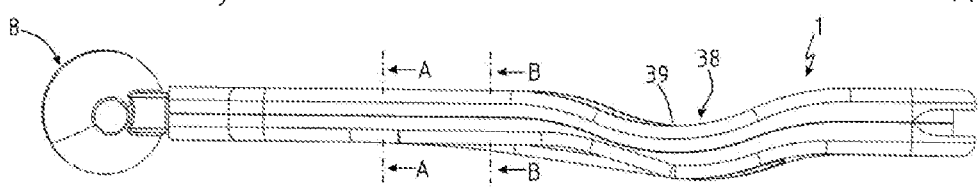
FIG. 5 shows the plan view of the support link arm having the rear shell segment according to the disclosure.
Figure 6:
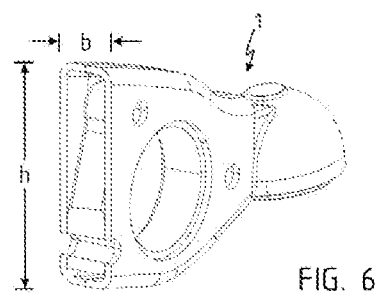
FIG. 6 shows a vertical cross section through the support link arm of FIG. 5 along the line A-A according to the disclosure.
Figure 7:
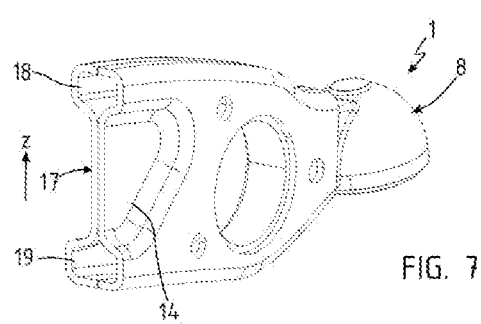
FIG. 7 shows a vertical cross section through the support link arm of FIG. 5 along the line B-B according to the disclosure.
Figure 8:
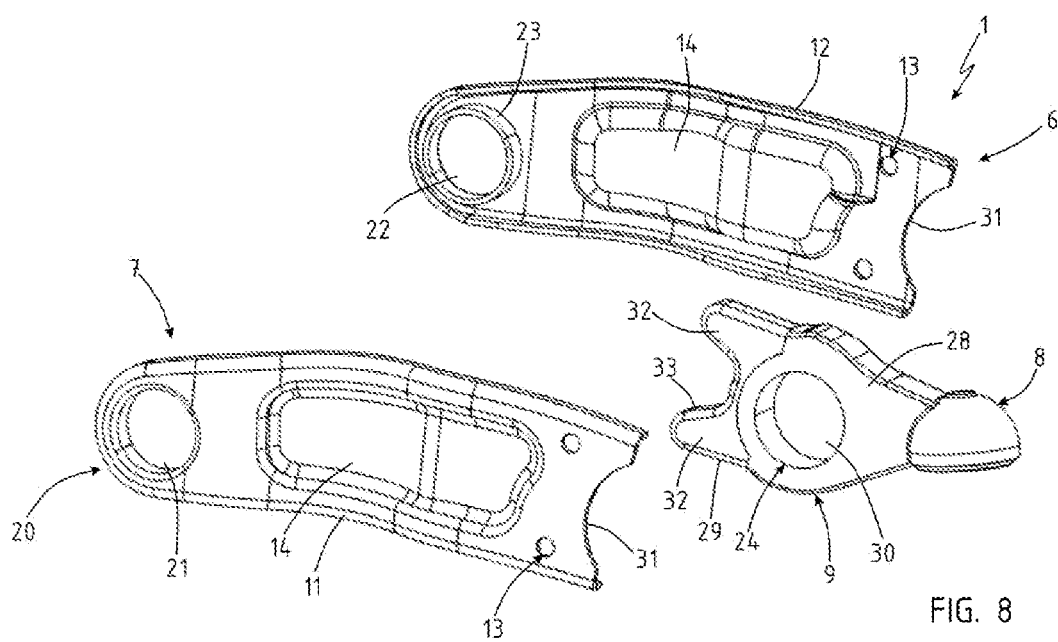
FIG. 8 shows the components of a second embodiment of a support link arm in an exploded illustration according to the disclosure.
Figure 9:
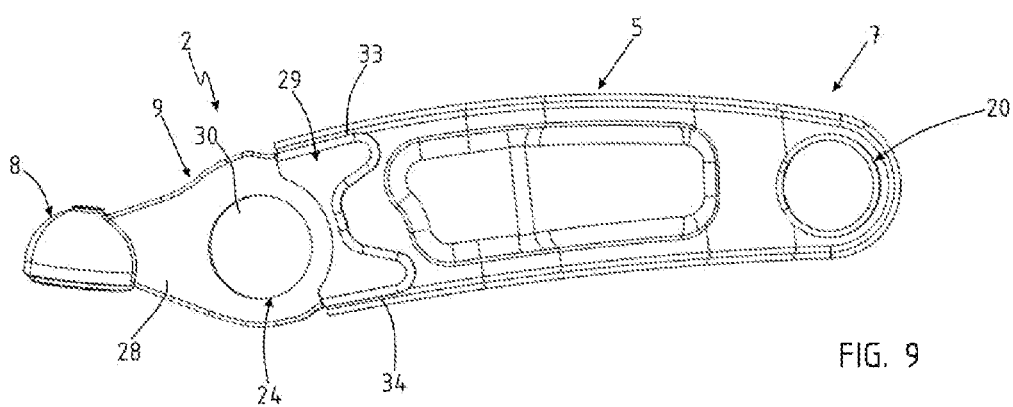
FIG. 9 shows a lateral view of the support link arm and without the rear shell segment in terms of the installed position in a vehicle according to the disclosure.
Figure 10:
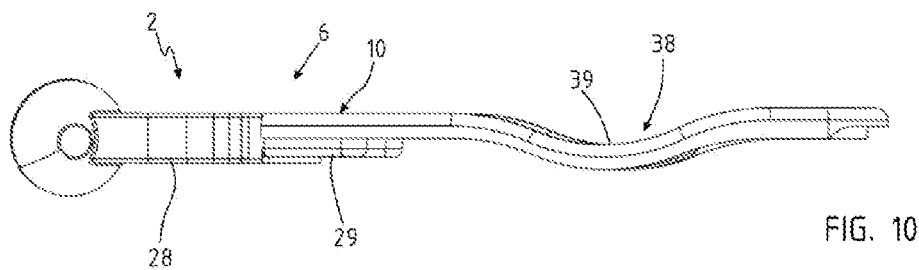
FIG. 10 shows the illustration corresponding to that of FIG. 9 in a plan view according to the disclosure.
Figure 11:
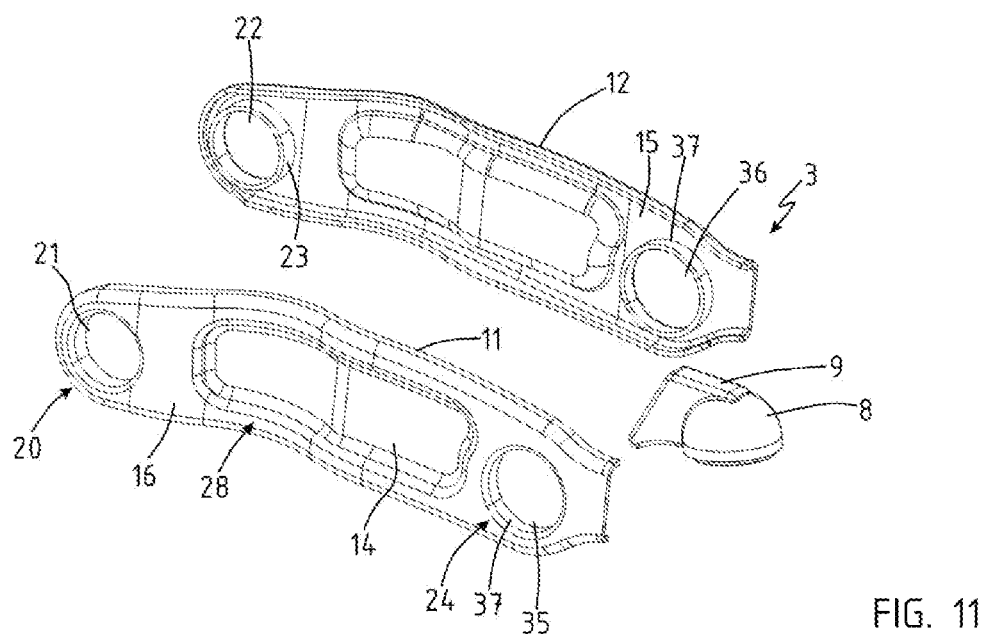
FIG. 11 shows a third embodiment of a support link arm according to the disclosure having an exploded illustration of the components thereof.
Figure 12:
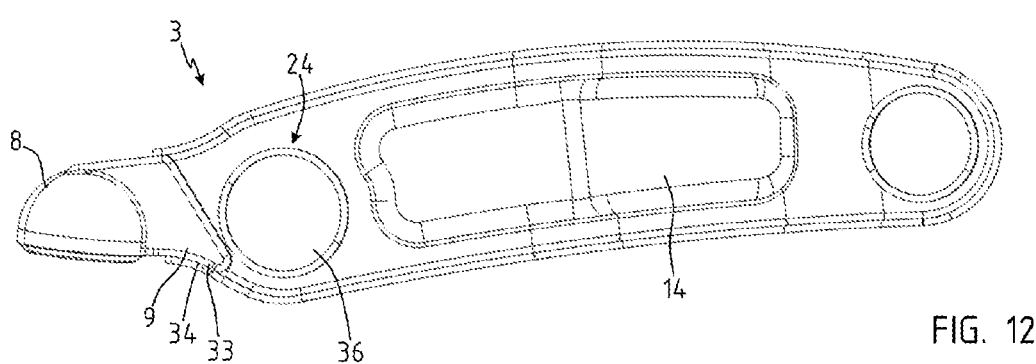
FIG. 12 shows a lateral view of the support link arm of FIG. 11 and without the rear shell segment in terms of the installed position in a vehicle according to the disclosure.
Figure 13:
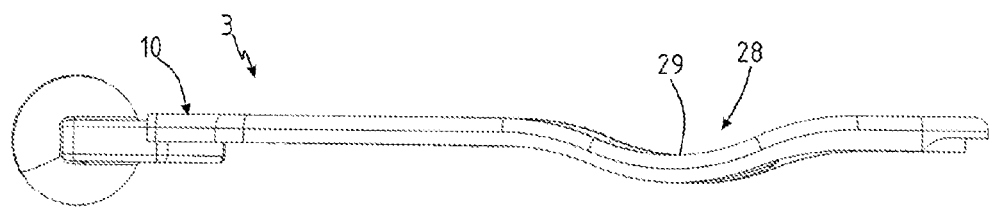
FIG. 13 shows the illustration of the support link arm corresponding to that of FIG. 12 in a plan view according to the disclosure.
Figure 14:
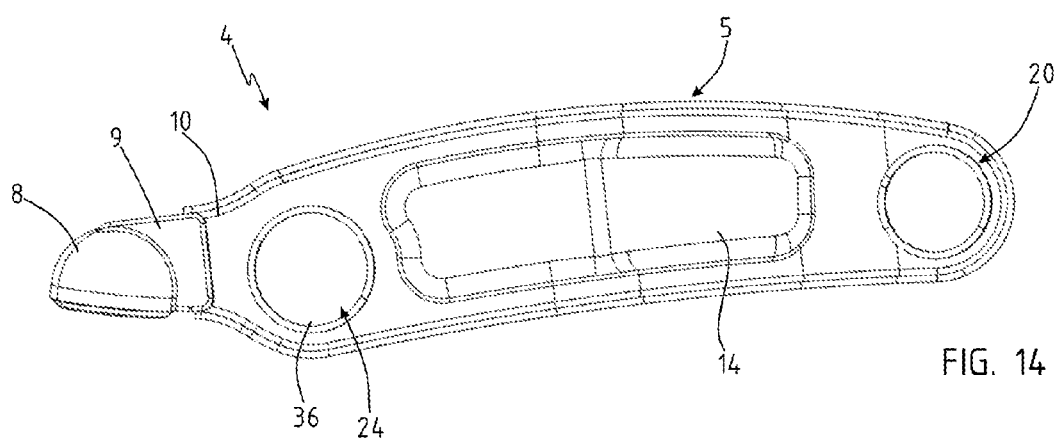
FIG. 14 shows a fourth embodiment of a support link arm in a lateral view and without the illustration of the rear shell segment in terms of the installed position in a vehicle according to the disclosure.
Figure 15:
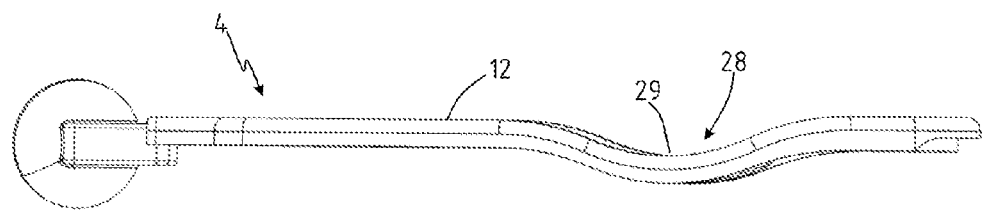
FIG. 15 shows the illustration of the support link arm corresponding to that of FIG. 14 in a plan view according to the disclosure.

A first embodiment of a support link arm 1 according to the disclosure is explained by means of FIG. 1 to FIG. 7. FIG. 8 to FIG. 10 show a second embodiment of a support link arm 2. FIG. 11 to FIG. 13 clarify a third embodiment of a support link arm 3. FIG. 14 and FIG. 15 illustrate a fourth embodiment of a support link arm 4.

Each support link arm 1 to 4 has an elongate link arm member 5 having a first longitudinal end 6 and a second longitudinal and 7. A ball joint socket 8 is disposed on the first longitudinal end 6.

The ball joint socket 8 is a forging or casting from metal from steel or aluminum, or an aluminum alloy, respectively. A fastening appendage 9 is molded in a materially integral manner on the ball joint socket 8 so as to be in one piece with the latter.

The link arm member 5 is formed from sheet metal and on the first longitudinal and 6 has a cavity portion 10. The link arm member 5 is assembled from two shell segments in the form of sheet-metal shells 11, 12. The sheet-metal shells 11, 12 contact one another on joining faces and thereon are joined in a materially integral manner, such as welded. The sheet-metal shells 11, 12 at the joining faces thereof are placed in a butt joint such that a stepless external face results along the joining faces. The assembled sheet-metal shells 11, 12 on the first longitudinal end thereof that faces the ball joint socket 8 form the cavity portion 10. The ball joint socket 8 by way of the fastening appendage 9 engages in the cavity portion 10 and is joined to the link arm member 5.

The sheet-metal shell 11 which in the installed position of the respective support link arm 1 to 4 is the rear sheet-metal shell 11 is omitted in FIGS. 4, 9, 10, 12, 13, 14 and 15.

In the support link arm 1, the ball joint socket 8 and the link arm member 5 are joined in a form-fitting manner by a rivet connection 13. To this end, rivets are inserted through the link arm member 5 and the fastening appendage 9 of the ball joint socket 8 in the region of the cavity portion 10. To this end, mutually adapted through openings for rivets are provided in the sheet-metal shells 11, 12 and the fastening appendage 9.

The connection between the ball joint socket 8 and the support link arm 2 in the support link arm 2 also takes place by riveting. The openings provided for a rivet connection 13 is able to be seen in FIG. 8.

A materially integral join between the ball joint socket 8 and the link arm member 5 is provided in the support link arms 3 and 4. To this end, the link arm member 5 and the ball joint socket 8 are welded to one another. The materially integral connection takes place on joining faces between the cavity portion 10 and the fastening appendage 9.

Each link arm member 5 of the support link arms 1 to 4 in the vertical cross section has a height h and a width b. The height h is sized so as to be larger than the width b, cf. to this end, such as the illustration of FIG. 6 and FIG. 7.

The link arm member 5, in terms of the external cross-sectional contour, is configured so as to be substantially rectangular, having a longer side of the rectangle which corresponds to the height h. Said longer side in terms of the installed position of a support link arm 1 to 4 is disposed in the vehicle height direction. The link arm member 5 has a correspondingly high modulus of resistance.

The link arm member 5 is configured so as to be rectangular in the cavity portion 10 (FIG. 6). The link arm member 5 in regions in the central longitudinal portion is configured so as to be H-shaped in the vertical cross section (FIG. 7).

Each sheet-metal shell 11, 12 has a bead 14 which extends in the longitudinal direction of the link arm member 5. The lateral walls 15, 16, running mutually parallel in the region of the bead 14, of the sheet-metal shells 11, 12 contact one another and form a vertical web 17. The lateral walls 15, 16, or the sheet-metal shells 11, 12, respectively, above and below the vertical web 17 configure cavity portions 18, 19 which in the longitudinal direction of the link arm member 5 extend from the first longitudinal end 6 to the second longitudinal end 7.

A bearing receptacle 20 is provided on the second longitudinal and 7 of the link arm member 5. The bearing receptacle 20 is formed by bearing openings 21, 22 in the lateral walls 15, 16 which at a mutual spacing run so as to be mutually parallel in the second longitudinal end 7. Each bearing opening 21, 22 has an encircling ring 23 which is directed inward in the direction toward the interior space of the link arm member 5. The bearing receptacle 20 forms a second attachment point for a body-proximal joint. A rubber mount is usually installed in the bearing receptacle 20.

The support link arms 1 to 4 have a further third attachment point in the form of a support joint receptacle 24. A spring/damper element is connected there. A support joint installed in the support joint receptacle 24 forms a force-introduction point for spring forces and damper forces which act perpendicularly and are greater than the horizontal forces.

The support joint receptacle 24 in the support link arm 1 is formed by bearing openings 25, 26, 27 which are disposed so as to be mutually coaxial. The cavity portion 10 in both mutually spaced apart, opposite lateral walls 15, 16 has in each case one bearing opening 25, 26. A bearing opening 27 is furthermore configured in the fastening appendage 9. The bearing openings 25, 26 in the lateral walls 15, 16, and the bearing opening 27 in the fastening appendage 9 are disposed so as to be congruent, or mutually coaxial, respectively, and form the support joint receptacle 24. This design embodiment is utilized when the spacing between the ball joint, or the ball joint socket 8, respectively, and a spring/damper element is small, because great forces act in this instance and a high degree of stiffness is required. The high loadbearing capability is implemented in that the bearing opening 27 in the fastening appendage 9 is designed in solid material.

The support joint receptacle 24 in the support link arm 2 is configured in the fastening appendage 9. To this end, the fastening appendage 9, proceeding from the ball joint socket 8, has a front support joint portion 28 which is adjoined by an end portion 29. The front support joint portion 28 is embodied so as to be thicker than the end portion 29. A bearing opening 30 which penetrates the width of the fastening appendage 9 is configured in the support joint portion 28. Regions of the support joint portion 28 which are on the rear side are embodied so as to be radiused. The free ends of the sheet-metal shells 11, 12 have a clearance 31 which is adapted to the contour of the rear-side region of the support joint portion 28. The sheet-metal shells 11, 12 are placed on the support joint portion 28 and joined to the latter. Prong-shaped protrusions 32 of the end portion 29 protrude rearward into the cavity portion 10 of the link arm member 5. Support flanks 33 which are in contact with support portions 34 in the link arm member 5 and support the sheet-metal shells 11, 12 are configured on the fastening appendage 9.

In the support link arms 3 and 4, the support joint receptacle 24 is configured by mutually communicating bearing openings 35, 36 in the lateral walls 15, 16 of the sheet-metal shells 11, 12 of the link arm member 5. The fastening appendage 9 is shorter and terminates in front of the support joint receptacle 24. The bearing openings 35, 36 have in each case one encircling, inward-directed ring 37, said rings 37 forming the bearing seat in the support joint receptacle 24.

The lateral walls 15, 16 in the cavity portion 10 and the fastening appendage 9 are in mutual contact and are mutually supporting. On the fastening appendage 9, support flanks 33 which are in contact with support portions 34 provided on the link arm member 5 are also configured in the support link arms 1, 3 and 4.

The link arm members 5 of the support link arms 1 to 4 in the proximity of the attachment proximal to the axial support, thus in the region of the second longitudinal end 7, have a predetermined kinking point 38. The latter is configured by a bead 39 which runs in the z-direction and extends across the entire height h of the link arm member 5. The predetermined kinking point 38 has the effect that the link arm member 5 kinks in a targeted manner when a specific force level acting on the wheel in the vehicle transverse direction is exceeded. A collapsing action of the link arm member 5 is also initiated by way of the predetermined kinking point 38 in the event of an impact with less overlap and a lower force acting on the wheel in the vehicle longitudinal direction. As a result of the bead 39 which runs in the z-direction, thus in the height direction of the link arm member 5, the link arm member 5 in the region of the predetermined kinking point runs in a curved manner, or in the longitudinal extent of said link arm member 5 has a curved longitudinal profile, respectively.

The link arm members 5 of the support link arms 1 to 4 have a yield point $R_p0.2$ between and including 480-880 MPa, a tensile strength $R_m$ between and including 580-1050 MPa, and a minimum elongation at break $A_{80mm}$ of >8%. The ball joint sockets 8 of the support link arms 1 to 4 have a yield point $R_p0.2$ between and including 400-600 MPa, a tensile strength $R_m$ between and including 600-820 MPa, and a minimum elongation at break A5 of more than >14%.

The support link arms 1 to 4 having a link arm member 5 and a ball joint socket 8 in the material combination and having the mechanical properties as set out above, and the geometric design, complement one another in a synergistic manner and guarantee that the support link arm 5 meets high and highest requirements in terms of stiffness and also withstands the highest dynamic loads. The geometric design embodiment relates to the installed position of the support link arms 1 to 4 in a motor vehicle. The link arm member 5 in the vertical cross section has a height h and a width b. The height h is sized so as to be larger than the width b.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations are able to be made hereto without departing from the spirit and scope of the disclosure.

The invention claimed is:

1. A support link arm comprising:
   a link arm member, wherein the link arm member comprises:
      a vertical cross section having a height and a width, the height having a larger dimension than the width,
      a cavity portion,
      a first longitudinal end, and
      a second longitudinal end; and
   a ball joint socket, wherein the ball joint socket comprises a fastening appendage, and the ball joint socket by way of the fastening appendage is configured to engage the cavity portion of the link arm member such that the ball joint socket is joined to the first longitudinal end,
      wherein the cavity portion comprises:
         two mutually spaced apart, opposite lateral walls,
         a bearing opening in each of the lateral walls, and
         a bearing opening in the fastening appendage, and the bearing opening in each of the lateral walls and the bearing opening in the fastening appendage are coaxial.

2. The support link arm according to claim 1, wherein the link arm member comprises two sheet-metal shell segments.

3. The support link arm according to claim 1, wherein the cavity portion comprises lateral walls, and each of the lateral walls contacts the fastening appendage.

4. The support link arm according to claim 1, wherein the link arm member comprises a plurality of support portions, and the fastening appendage comprises a plurality of support flanks, and each support flank of the plurality of support flanks correspondingly contacts each support portion of the plurality of support portions.

5. The support link arm according to claim 1, wherein the link arm member comprises a rectangular vertical cross section.

6. The support link arm according to claim 1, wherein the link arm member comprises an H-shaped vertical cross section.

7. The support link arm according to claim 1, further comprising an attachment point for a spring and damping element between the first longitudinal end and the second longitudinal end.

8. The support link arm according to claim 1, wherein the fastening appendage comprises a support joint receptacle.

9. The support link arm according to claim 1, wherein the link arm member comprises at least one bead.

10. The support link arm according to claim 1, wherein the link arm member comprises at least one predetermined kinking point.

11. The support link arm according to claim 1, wherein the ball joint socket is integral with the link arm member.

12. The support link arm according to claim 1, wherein the ball joint socket and the link arm member are joined in a form-fitting manner.

13. The support link arm according to claim 1, wherein the second longitudinal end comprises a bearing receptacle, and the second longitudinal end is opposite the first longitudinal end.

14. The support link arm according to claim 1, wherein the link arm member comprises
   a yield point Rp0.2 between and including 480-880 MPa,
   a tensile strength Rm between and including 580-1050 MPa, and
   a minimum elongation at break A80 mm of >8%; and
the ball joint socket comprises
   a yield point Rp0.2 between and including 400-600 MPa,
   a tensile strength Rm between and including 600-820 MPa, and
   a minimum elongation at break A5 of >14%.

15. The support link arm according to claim 1, wherein the link arm member is elongated in shape.

16. The support link arm according to claim 1, wherein the link arm member comprises sheet metal.

17. The support link arm according to claim 1, wherein the ball joint socket is a forging or a casting from metal.

18. The support link arm according to claim 1, wherein the ball joint socket and the link arm member are joined by a weld.

19. The support link arm according to claim 1, wherein the ball joint socket and the link arm member are joined by a rivet.

* * * * *